May 15, 1951

C. J. McWHORTER 2,552,991

VALVE ASSEMBLY

Filed April 16, 1948

Inventor
Cullen J. McWhorter

By

E. V. Hardway.
ATTORNEY.

May 15, 1951  C. J. McWHORTER  2,552,991
VALVE ASSEMBLY

Filed April 16, 1948  2 Sheets-Sheet 2

Inventor
Cullen J. McWhorter

By
E. V. Hardway.
ATTORNEY.

Patented May 15, 1951

2,552,991

UNITED STATES PATENT OFFICE 2,552,991

VALVE ASSEMBLY

Cullen J. McWhorter, South Houston, Tex., assignor to South Houston Machine Company, South Houston, Tex., a corporation of Texas Application April 16, 1948, Serial No. 21,522

6 Claims. (Cl. 251—62)

This invention relates to a valve assembly.

An object of the invention is to provide a valve assembly embodying a special type of expansible valve equipped with substantially rigid discs to cover the fluid passageway through the valve casing and which are sufficiently flexible to conform to the contour of, and to fit closely against, the opposing seats so as to form fluid tight joints when the valve is closed.

Another object is to provide, in the assembly, a valve having a novel arrangement of parts and a novel connection with the valve casing and operating stem.

Other objects and advantages will be apparent from the following specification which is illustrated by the accompanying drawings, wherein.

Figure 3:
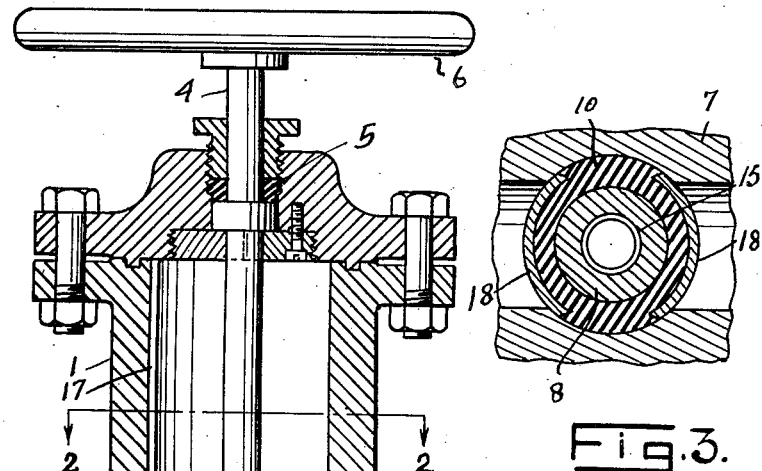
Figure 3 is a fragmentary, cross-sectional view taken on the line 3—3 of Figure 1.

Referring more particularly to the drawings the numeral 1 designates the valve casing as a whole. This casing is, preferably, cylindrical in form and closed at one end which is provided with an inside, central, stop 2.

The other end of the casing is provided with the conventional end plate 3 secured thereto in any preferred manner.

A valve stem 4 has a swivelling connection with the plate 3 and is surrounded by a stuffing box 5 mounted on the end plate.

The valve may be operated by means of a hand wheel 6 fixed on the outer end of the stem.

The valve casing 1 is provided with tubular lateral connections 7, 7 for connecting the assembly into a pipe line or other conduit.

Slidably mounted in the valve casing 1 there is a valve of novel formation. This valve embodies a cylindrical valve body 8 one end of which fits snugly in the casing. The body is reduced in diameter forming an external annular shoulder 9.

Fitted around the body there is a resilient sleeve 10, formed of rubber or similar material and one end of which abuts the shoulder 9. This sleeve is of a normal external diameter to fit snugly in the valve casing.

Fitted over the other end of the valve body there is a cap 11 the free edge of whose flange abuts the adjacent end of sleeve 10. The cap has a limited longitudinal movement relative to the body.

This longitudinal movement is limited in any preferred manner, as by a key 12, carried by the cap and whose inner end works in a short longitudinal keyway 13 in the side of the corresponding end of the valve body.

The cap 11 is also of an external diameter to fit snugly on the valve body.

The cap 11 has an axial, tapped hole 14 and aligned therewith the valve body has a deep, axial, internally threaded socket 15.

The inner end of the stem 4 is enlarged and provided with external threads 16 pitched to mesh with the threads of said tapped hole as well as the threads of said socket.

Figure 1:
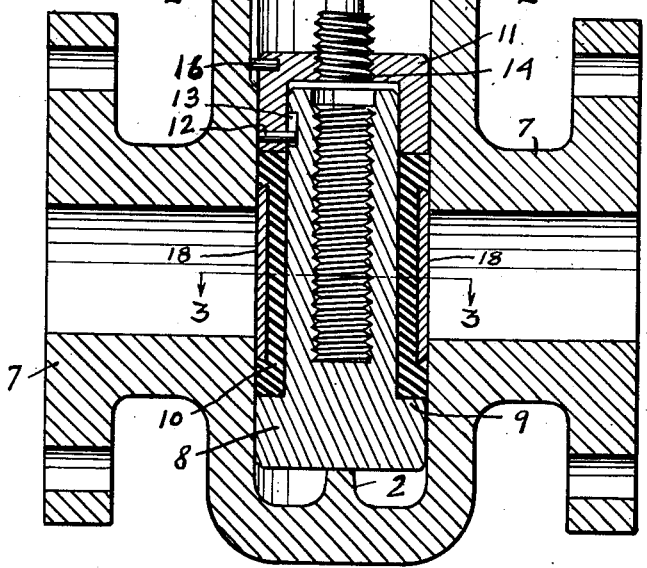
Figure 1 is a sectional view of the assembly, showing the valve closed.
Figure 2:
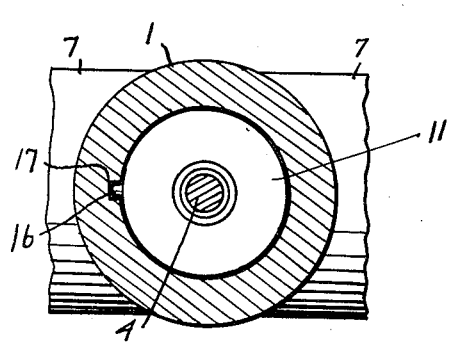
Figure 2 is a fragmentary, cross-sectional view thereof taken on the line 2—2 of Figure 1.
Figure 4:
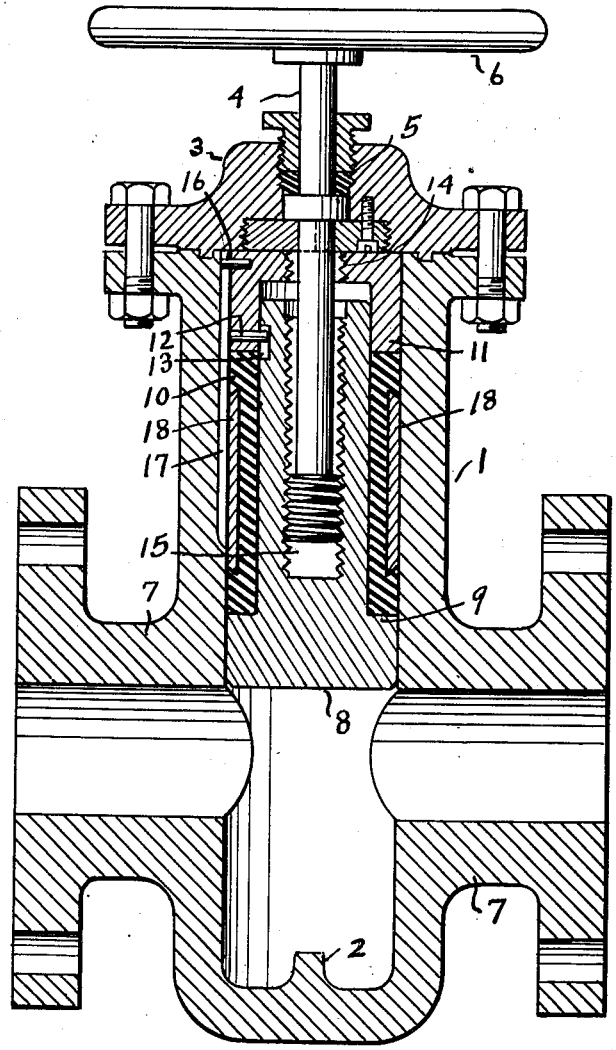
Figure 4 is a sectional view of the assembly showing the valve open.

In order to close the valve the stem may be appropriately turned to move the valve from the position shown in Figure 4 to that shown in Figure 1. During this movement the valve will be held against rotation by the key 16 extending outwardly from cap 11 and projecting into the longitudinal keyway 17 in the inner wall of the casing.

At the beginning of the closing movement the stem has a threaded connection with the inner end of the socket 15 and the keys 12 and 16 are at the outer ends of their respective keyways, and the sleeve 10 will be unexpanded. As the rod 4 is turned the valve will gradually move inwardly until the inner end of the body 8 abuts the stop 2 at which time the valve will be entirely across the liquid passageway through the connections 7.

Embedded within the material of the sleeves, on opposite sides, are the circular, arcuate plates 18, 18 formed or rigid, wear resisting material, preferably a suitable metal, and slightly flexible. These plates are curved to conform to the curvature of the inside walls of the valve body and are of greater transverse diameter than that of the passageway through connections 7.

When the movement of the valve body is arrested by stop 2 the valve plates 18 will be substantially concentric with said connection passageway to close the same.

Upon further rotation of the valve stem its threads will intermesh with the threads of cap 11 and disengage from the threads of the valve body, and upon a continued rotation of said stem the cap 11 will be forced, correspondingly, inwardly thus applying endwise pressure to the sleeve 10 and causing it to expand and form a fluid tight seal with the inside walls of the body and at the same time forcing the valve plates 18 in metal to metal contact with said walls on each side of the casing around the passageway, as shown in Figure 1.

Upon reversal of the rotation of the valve stem the cap 11 will first be moved outwardly to relax the pressure on the sleeve 10 and plates 18 and the threads of the stem 4 will then mesh with the threads of the valve body and the valve will be moved outwardly to open position, as shown in Figure 4.

The foregoing description, and the accompanying drawings, are illustrative only when the broad principle of the invention will be defined by the appended claims.

What I claim is:

1. A valve assembly comprising, a valve casing having tubular lateral connections, a stem having a swivelling connection with the casing and extended into the casing, said stem having external threads, a valve body fitted in the casing and having an axial threaded bore, a cap on one end of the body means connecting the cap and body for limited longitudinal, non-rotative, movement of the cap relative to the body said cap having a tapped hole aligned with said bore, a resilient sleeve on the body against one end of which the cap abuts means on the body engageable by the other end of the sleeve, the stem threads being adapted to intermesh with the body threads to move the valve to position to close said connections, upon rotation of the stem in one direction and upon a continued rotation of the stem in the same direction to thereafter mesh with the cap threads to force the cap against the sleeve to expand the sleeve.

2. A valve assembly comprising, a valve casing closed at one end and having tubular lateral connections, an end plate secured on the other end of the casing, a stem extended into the casing through the plate and having a swivelling connection therewith and having external threads, a valve body fitted in the casing and having an axial, internally threaded bore, a cap on one end of the body means connecting the cap and body for limited longitudinal, non-rotative, movement of the cap relative to the body, said cap having a tapped hole aligned with said bore, a resilient sleeve on the body against one end of which the cap abuts external abutment means on the body engageable by the other end of the sleeve, the stem threads being adapted to intermesh with the body threads to move the valve to position to close said connections, upon rotation of the stem in one direction, and upon a continued rotation of the stem in the same direction to thereafter mesh with the cap threads to force the cap against the sleeve to expand the sleeve.

3. A valve assembly comprising, a valve casing having tubular lateral connections, a stem having a swivelling connection with the casing and extended into the casing, said stem having external threads, a valve body fitted in the casing and having an axial threaded bore, a cap on one end of the body means connecting the cap and body for limited longitudinal, non-rotative, movement of the cap relative to the body said cap having a tapped hole aligned with said bore, a resilient sleeve on the body against one end of which the cap abuts means on the body forming an external shoulder engageable by the other end of the sleeve, the stem threads being adapted to intermesh with the body threads to move the valve to position to close said connections, upon rotation of the stem in one direction and upon a continued rotation of the stem in the same direction to thereafter mesh with the cap threads to force the cap against the sleeve to expand the sleeve, rigid plates carried by the sleeve and positioned to cover said connections when the valve is closed.

4. A valve assembly comprising, a valve casing closed at one end and having tubular lateral connections, a closure secured on the other end of the casing, a stem having a swivelling connection with said closure and extended into the casing and having external threads, a valve body fitted in the casing and having an axial, internally threaded bore, a cap on one end of the body means connecting the cap and body for limited longitudinal, non-rotative, movement of the cap relative to the body said cap having a tapped hole aligned with said bore, a resilient sleeve on the body against one end of which the cap abuts abutment means on the body engageable by the other end of the sleeve, the stem threads being adapted to intermesh with the body threads to move the valve to position to close said connections, upon rotation of the stem in one direction and upon a continued rotation of the stem in the same direction to thereafter mesh with the cap threads to force the cap against the sleeve to expand the sleeve to close said connections, said threads being effective upon rotation of the stem in the opposite direction to relieve the cap from the sleeve and to intermesh with the body threads to move the valve into position clear of said connections.

5. A valve assembly comprising, a valve casing closed at one end and having tubular lateral connections, an end closure secured to the other end of the casing, a stem extended into the casing and having a swivelling connection with said closure, said stem being provided with external threads, a valve body fitted in the casing and having an axial internally threaded bore and being splined against rotation in the casing, a cap on one end of the body means connecting the cap and body for limited longitudinal, non-rotative, movement of the cap relative to the body, said cap having a tapped hole aligned with said bore, a resilient sleeve on the body against one end of which the cap abuts abutment means on the body engageable by the other end of the sleeve, the stem threads being adapted to intermesh with the body threads to move the valve to position to close said connections, upon rotation of the stem in one direction, and upon a continued rotation of the stem in the same direction to thereafter mesh with the cap threads to force the cap against the sleeve to expand the sleeve.

6. A valve assembly comprising, a valve casing closed at one end and having tubular lateral connections, an end closure secured to the other end of the casing, a stem extended into the casing and having a swivelling connection with said closure, said stem being provided with external threads, a valve body fitted in the casing and having an axial internally threaded bore and being splined against rotation in the casing, a cap on one end of the body means connecting the cap and body for limited longitudinal, non-rotative, movement of the cap relative to the body, said cap having a tapped hole aligned with said bore, a resilient sleeve on the body against one end of which the cap abuts means on the body providing an external shoulder thereon engageable by the other end of the sleeve, the stem threads being adapted to intermesh with the body threads to move the valve to position to close said connections, upon rotation of the stem in one direction, and upon a continued rotation of the stem in the same direction to thereafter mesh with the cap threads to force the cap against the sleeve to expand the sleeve, approximately rigid plates carried by the sleeve and positioned to cover said connections upon such expansion of the sleeve.

CULLEN J. McWHORTER.

REFERENCES CITED

The following references are of record in the file of this patent:

UNITED STATES PATENTS

| Number | Name | Date |
| --- | --- | --- |
| 2,162,990 | Abercrombie | June 20, 1939 |
| 2,194,260 | Allen | Mar. 19, 1940 |
| 2,218,093 | Penick | Oct. 15, 1940 |
| 2,331,557 | Lorehn | Oct. 12, 1943 |

FOREIGN PATENTS

| Number | Country | Date |
| --- | --- | --- |
| 454,546 | Great Britain | of 1936 |